United States Patent [19]

Stewart

[11] 4,152,546
[45] May 1, 1979

[54] RINGER POWER GENERATOR CIRCUIT FOR CARRIER SUBSCRIBER STATION TERMINAL

[75] Inventor: James A. Stewart, Menlo Park, Calif.

[73] Assignee: GTE Automatic Electric Laboratories, Inc., Northlake, Ill.

[21] Appl. No.: 827,529

[22] Filed: Aug. 25, 1977

[51] Int. Cl.² .......................... H04J 1/00; H04M 1/26
[52] U.S. Cl. ............................. 179/2.5 R; 179/17 E; 363/19
[58] Field of Search ................ 179/2.5 R, 17 E, 84 R; 363/18, 19

[56] References Cited

U.S. PATENT DOCUMENTS

| | | | |
|---|---|---|---|
| 3,302,130 | 1/1967 | Minks | 363/18 |
| 3,510,584 | 5/1970 | Krasin et al. | 179/2.5 R |
| 3,886,321 | 5/1975 | Krasin et al. | 179/84 R |
| 3,904,833 | 9/1975 | Beene et al. | 179/84 R |
| 3,927,266 | 12/1975 | Stewart et al. | 179/2.5 R |

OTHER PUBLICATIONS

"Transistor Manual", General Electric Co., Seventh Edition, 1969, p. 52.

Primary Examiner—Kathleen H. Claffy
Assistant Examiner—Kenneth A. Chayt
Attorney, Agent, or Firm—Russell A. Cannon

[57] ABSTRACT

A ringer-power generator circuit is provided in which ring pulses cause positive and negative output voltages of a swinging choke regulator to be alternately connected to one of the tip and ring lines of a handset; and cause a control circuit to be alternately connected to and disconnected from a supply voltage. The control circuit has an RC timing circuit which delays initial turn on of the regulator to prevent bell tapping, and includes a transistor, diodes and timing circuit which control maximum output power and maximum output voltage of the regulator for causing the latter to essentially operate as a voltage limited high impedance source.

15 Claims, 1 Drawing Figure

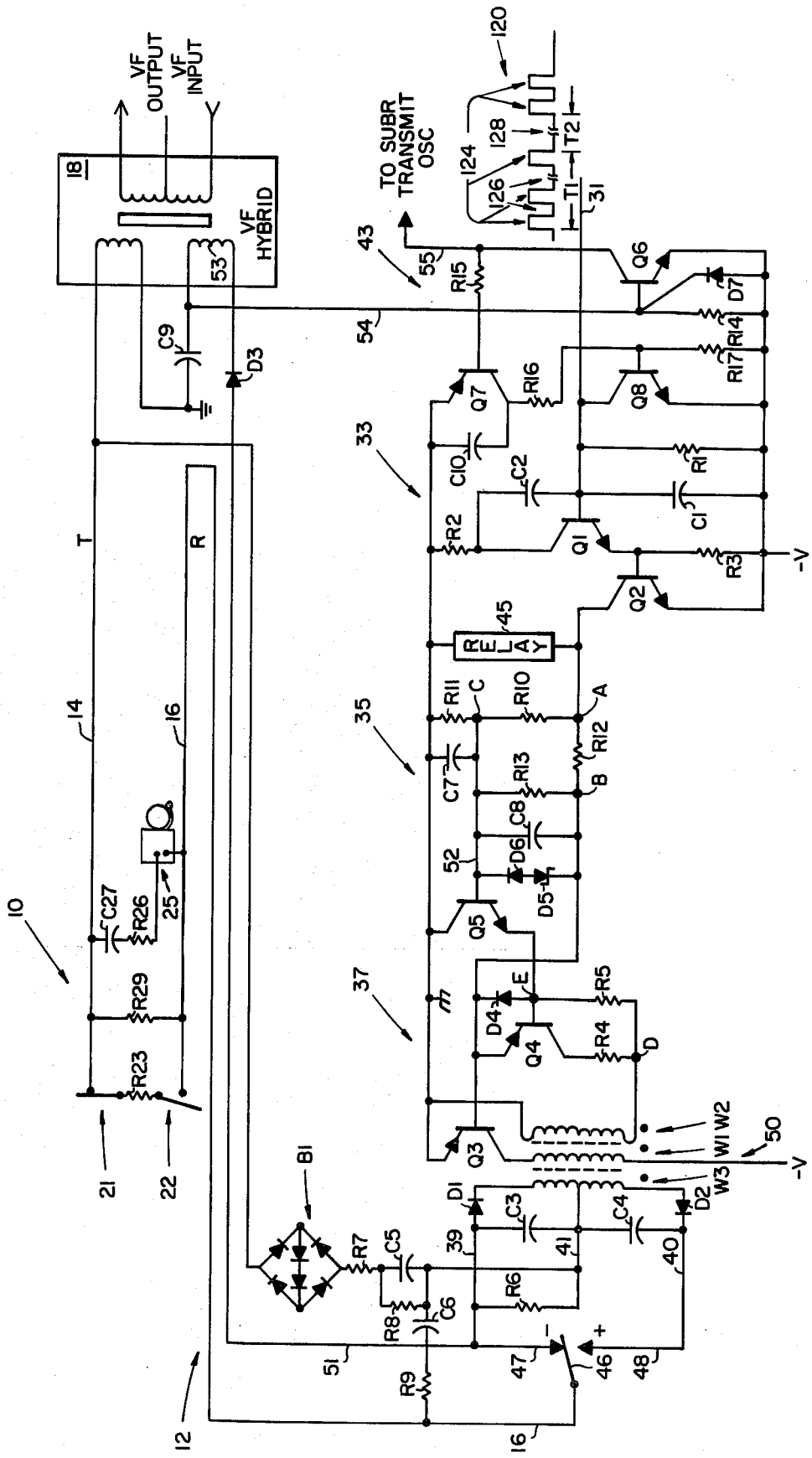

RINGER POWER GENERATOR CIRCUIT FOR CARRIER SUBSCRIBER STATION TERMINAL

BACKGROUND OF INVENTION

This invention relates to ringer generator circuits and more particularly to a ringer-power generator circuit for the carrier subscriber terminal of a carrier telephone communication system.

Single and multichannel subscriber carrier telephone systems are finding increased application since they may provide additional communication channels over existing cable pairs. Carrier subscriber terminals of such systems may be energized directly by power from the central office on the cable pair, by local power at the subscriber's location, or by a local battery that is charged by central office battery current on the cable pair. Some subscriber carrier telephone systems and associated carrier subscriber terminal ringer generator circuits are generally described in the prior-art U.S. Pat. Nos. 3,886,321, May 27, 1975 by Krasin et al; 3,904,833, Sept. 9, 1975 by Beene; and 3,927,266, Dec. 16, 1975 by Stewart et al. In this Krasin patent, a 300 Hz central office ringing signal, which is detected at the subscriber terminal, keys a 20 Hz oscillator. Energization of the oscillator is delayed to prevent ringing on transients. The oscillator logically drives a switch which alternately connects a unidirectional DC voltage of +225 volts and 0 volts to one of the tip and ring leads of a handset to energize the ringer thereof. Experience has shown that it is undesirable to have such a high DC voltage present on traces of a printed circuit board since it may damage them. Employing a unidirectional ringing voltage also requires additional set-up time for an installer to polarize a ringer prior to connection of the associated handset to the tip and ring lines. Krasin discloses a subscriber carrier system with another ringer circuit in his U.S. Pat. No. 3,510,584, dated May 5, 1970. The Beene patent discloses a system in which the subscriber terminal is powered from the central office. A stepped up line voltage from the central office during ringing causes a circuit in the subscriber terminal to energize a blocking oscillator of a DC-DC power converter to produce constant amplitude pulses of a prescribed frequency for charging a capacitor. The converter includes a Zener diode which senses the output voltage on the capacitor and limits it to a maximum level. A central office ringing signal is also detected to produce a constant voltage pulse throughout a ringing period which turns on a squarewave generator. The output of the generator causes a pair of transistors to alternately conduct to connect the capacitor to and disconnect it from the ringer of a handset. This method of generating a local subscriber ringing signal for driving a handset ringer is relatively complex. The invention in this patent is an improvement over that in the Stewart U.S. Pat. No. 3,927,266. The Stewart patent discloses a subscriber carrier system in which the subscriber terminal includes a local battery which may be charged from the central office battery and a handset that requires only a two-wire drop. The subscriber ringer circuit there employs a constant voltage type DC-to-DC voltage converter which is powered only during the ringing period of a ringing cycle to simultaneously produce both positive and negative DC ringing voltages that are alternately connected to one of the tip and ring lines. It has been found that such a converter may be short circuit unstable which makes ring trip difficult to accomplish. Such a converter circuit also employs two transistors as well as a series switch to turn it on and off, the latter reducing the circuit efficiency.

An object of this invention is the provision of an improved ringer generator circuit for the carrier subscriber terminal of a subscriber carrier telephone system.

DESCRIPTION OF DRAWING

This invention will be more fully understood from the following detailed description of a preferred embodiment thereof together with the single FIGURE of drawing which is a schematic circuit diagram of a handset 10 connected to a ringer-power generator circuit 12 embodying this invention.

DETAILED DESCRIPTION OF PREFERRED EMBODIMENT

The ringer-power generator 12 is designed to operate in a carrier subscriber terminal employing a local battery that provides a supply voltage $-V$ of typically 6 volts, for example, and is charged by line current from a central office battery. A carrier subscriber handset 10 is bridged across a 2-wire drop line having tip (T) and ring (R) lines 14 and 16 that are connected to the ringer generator 12 and to the VF hybrid 18 in a carrier subscriber terminal. The handset 10 is shown in the on-hook condition and is represented as comprising dial contacts 21, hook switch contacts 22, and resistor R23 connected in series across the drop lines; a straight line AC ringer 25, resistor R26, and capacitor C27 connected in series across the drop lines; and a shunt resistor R29 representing the leakage resistance of the ringer. R26, which represents the series resistive component of the impedance of ringer 25 at resonance, is about 8 kohms for a 20 Hz ringing signal and is about 200 kohms at 1 kHz so that it does not shunt voice signals. C27, which represents the capacitive component of the impedance of ringer 25, is about 0.47 microfarad. The inductance of the ringer 25 at resonance is about 120 henries. The leakage resistance R29 is approximately 73 megohms which is connected across the tip and ring lines when the handset 10 is on-hook. R23, which represents the impedance presented by the handset 10 itself is only approximately 200 ohms when it is off-hook. Although only one handset is shown in the FIGURE, at any instant in time there may be none or several handsets and associated ringers bridged across the tip and ring lines. Two handsets connected to the drop lines may be considered to present a normal load to the ringer generator 12, whereas three or more handsets, or only one handset, present heavy and light loads, respectively.

The carrier subscriber terminal includes circuitry (not shown) that detects a 20 Hz carrier ringing signal from the central office terminal which is rectified to provide low voltage DC ring pulses 124 on line 31. The detected 20 Hz ringing signal 120 on line 31 typically comprises four second silent periods T2 located between two second ringing periods T1 during which a plurality of 20 Hz ring pulses 124 are present. Each ring pulse 124 has an associated ring pulse time interval. Ring pulse separation intervals 126 occur between adjacent ring pulses 124 in the same ringing period T1. A ringing cycle consists of an adjacent ringing period and silent period.

The generator 12 essentially comprises a pulsing circuit 33 receiving the detected ringing signal 120 on line 31; a control circuit 35; a power converter 37 which is operated as a constant current source for producing negative and positive DC output ringing voltages on lines 39 and 40 with respect to the neutral terminal 41 during ringing periods T1; and a ring trip circuit 43. When an input signal 120 is absent from line 31, all of the transistors and diodes of generator 12 are cut off, a relay coil 45 is de-energized, and the moveable arm 46 of the relay is connected to the fixed relay contact 47.

The pulsing circuit 33 comprises a capacitor C1 and reistor R1 which filter out any carrier signal that may leak through to the input line 31; a control transistor Q1 having a Miller capacitor C2 connected across the collector-base junction thereof for slowing down its turn on and turn off; a transistor Q2 for driving the relay having a coil 45 associated with a moveable arm 46 and fixed contacts 47 and 48; and current-limiting resistor R2 and bias resistors R3 and R1. Q1 is turned on by each ring pulse 124 to provide base current for Q2 which conducts to energize relay coil 45 and connect node A to the supply voltage −V. Q1 and Q2 are cut off during separation intervals 126 and silent intervals 128.

The power converter circuit 37 is a switching power converter of the energy storage-energy discharge type. It comprises a single power transistor Q3 and a ferrite core transformer 50 having a primary winding W1, a secondary-feedback winding W2 and a center tapped output winding W3. The turns ratio of W2 and W1 and W3 to W1 may be 1:1 and 50:1, respectively. The Q3 emitter is connected to ground and its collector is connected through W1 to the supply voltage −V. One end of the feedback winding W2 is connected to ground. The other end of W2 is connected through a small resistor R4 and the Q4 collector-emitter path to the Q3 base in a direction for providing a positive feedback voltage which regeneratively turns on Q3 once it is initially allowed to conduct. A second resistor R5 is connected across R4 and the Q4 base-collection junction. R4 and R5 may have resistances in the order of 40 and 300 ohms, respectively. The center tap of W3 is a neutral terminal 41 which is connected through R6 to output line 39. The two halves of W3 are connected through oppositely poled diodes D1 and D2 to associated storage elements C3 and C4 which may be 8 microfarad, 150 volt, electrolytic capacitors polarized in the directions shown in the drawing. D1 and D2 are poled so that output current flows from the output windings to C3 and C4 when Q3 is open. Stated differently, energy is stored in the transformer windings when Q3 is closed/conducting, and is discharged into C3 and C4 and the load (ringer 25) when Q3 is open/cut-off.

An AC ringing voltge for the ringer 25 is obtained by causing the relay coil 45 to switch the ring lead 16 between relay contacts 47 and 48 and the −120 volt and +120 volt DC output ringing voltages on associated output lines 39 and 40. When an input signal 120 is absent from input line 31, the ring line 16 is connected through relay arm 46 and contact 47, line 51 and diode D3 to the VF hybrid 18. D3 decouples hybrid 18 from output line 39 during ringing, i.e., when the negative ringing voltage on line 39 is greater (less negative) than 6 volts. The neutral terminal 41 of the converter is connected through capacitor C5, current limiting resistor R7 and a diode bridge B1 to tip line 14 and the hybrid 18. C5 is employed for ring-trip as is described more fully hereinafter. B1 decouples ringer generator 12 from the drop during talking so that circuit 12 does not clip voice signals there. This is accomplished by the bridge causing generator 12 to present a high impedance across tip and ring lines 14 and 16 when the handset 10 is off-hook and voice signals there are less than the 2.4 volt drop of the four silicon diodes in each conduction path of B1. R8 and R6 may operate during an off-hook condition to discharge C5 and C3, if they are charged in opposite directions, so that they do not hold the B1 diodes on and clip voice signals. A resistor R9 and capacitor C6 are connected in series between ring line 16 and the neutral terminal 41 to protect the form-C relay contacts 46–48 from a possible over-voltage on C3 or C4.

Q3 and converter 37 are essentially free-running during a ringing period T1, with its turn off time being set by the control circuit 35 as is described more fully hereinafter. This means that once Q3 is turned on, the operation of converter 37 is not controlled by the recurrence frequency of ring pulses 124, although they must be occurring for circuits 35 and 37 to operate. Thus, the operating frequency of converter 37 is load dependent. Q3 free runs at ≃25 kHz under no load conditions and at ≃5 kHz under full load conditions. Relatively simple regulation techniques may be employed for a power converter operating into fixed loads. In this application, however, it is required: (i) that converter 37 draw no current when current is not required for ringing; (ii) that the no-load output voltages on lines 39 and 40 not exceed the ratings of C3 and C4; (iii) that the input power to converter 37 decrease when output lines thereof are short circuited (i.e., on ring-trip); and; (iv) that converter 37 remain turned off for spurious pulses which may be produced on line 31 such as by lightning surges. A relatively sophisticated control circuit 35 is therefore required to regulate the operation of converter 37.

The control circuit 35 essentially comprises a catching transistor Q5 having its emitter-collector path connected between the Q4 base and ground; a primary timing circuit connected to the Q5 base and including C7, R10 and R11; a secondary timing circuit connected to the Q5 base and including C8, R13 and R12, the latter being a start-up resistor for Q3; and a junction diode D4, a 4.3 volt Zener diode D5, and junction diode D6 connected in series between the Q4 and Q5 base electrodes. The control circuit 35 is connected to the supply voltage −V only when Q2 conducts. The control circuit 35 functions to: (1) turn on Q3 only for legitimate detected ringing signals 120; (2) to control the maximum output ringing voltages of converter 37 for light ringing loads such as only one ringer connected to the tip and ring lines; and (3) to control the converter output power and current in Q3 for heavy ringing loads such as produced by three or more handsets on lines 14 and 16. The charge voltage on C7 controls the Q3 base-emitter voltage $V_{be}$ at which Q5 conducts during each cycle of operation of converter 37 to limit the current in Q3 and thereby cause it to be cut off. Q5 also controls the maximum Q3 base-emitter voltage and thus the maximum input current and power to converter 37. The Q5 emitter voltage is set by the series resistors of voltage divider R10 and R11 to control the maximum output power of converter 37, and by R5, D4, D5 and D6 to control the maximum output voltage of the converter. Q4 decouples the low resistance feedback winding W2 from the Q3 base to allow R12 to operate as a start up resistor providing a start up current for Q3 when Q5 allows Q3 to fully conduct. C7 stores a charge voltage which allows Q3 to free-run continuously throughout the ringing period T1, i.e., both the time intervals of ring pulses 124 and separation intervals 126.

In order to prevent bell tapping for transient signals on iput line 31, and thereby satisfy the first function of the control circuit 35, the time constants associated with C7 and C8 are such that Q5 prevents conduction of Q3 and operation of converter 37 for at least a predetermined time interval after Q2 and Q1 are turned on in a ringing period T1. The values of C8, R10, R12, and R13 are selected to require that a voltage be present at node A for at least the major portion of a 25 millisecond ring pulse 124 before the voltage at node B is sufficient for R12 to provide a starting current for Q3. The values of C7, R10 and R11 are selected to require that a voltage be present at node A for a sum total of greater than say 50 milliseconds, which is twice the time interval of a ring pulse 124, before a bias voltage is produced on line 52 that is sufficient to hold Q5 cut off so that Q3 can conduct. In this manner, generator 12 is rendered insensitive to spurious signals such as are caused by lightning and are nominally less than 10 milliseconds in duration. In a ringer generator 12 that was successfully operated, the resistances of R10 and R11 were 900 ohms and 1100 ohms, so that a 300 microfarad capacitor C7 had a smaller charge time constant (150 milliseconds) than discharge time constant. In this manner, C7 charges faster toward a voltage of slightly greater than 3 volts during the time interval of a pulse 124 than it discharges from approximately 1.5 volts during an inteveral 126. In this ringer generator, the resistances of R12 and R13 associated with a 0.01 microfarad capacitor C8 had the same 5 kohm values which are much greater than the resistances of R10 and R11 to provide charge and discharge time constants of approximately 0.02 milliseconds. This means that when each ring pulse 124 is present on line 31, C8 will charge sufficiently during that ring pulse time interval for R12 to provide a starting current for Q3. It does not produce output voltages of any consequence on lines 39 and 40 at this time. Since the charge time constant associated with C7 is 150 milliseconds and the time interval of a ring pulse 124 is only 25 milliseconds, however, several ring pulses 124 are required before C7 is charged sufficiently to bias Q5 into cut off. It is only then that Q3 is allowed to fully conduct. This charge-discharge operation of C7 results in an average of approximately 1.2 volts on C7 which normally maintains converter 37 operating during both time intervals of ring pulses 124 and separation intervals 126 of a ringing period T1.

If the maximum output voltage of converter 37 is greater than a prescribed value such that the induced voltage on W2 at node D is greater than the sum of the forward voltages of junction diodes D4 and D6 and the breakdown voltage of Zener D5 (i.e., greater than 5.7 volts), then circuit 35 performs the second control function by causing these diodes to conduct through W2 to discharge C7 somewhat and cause Q5 to then conduct at a lower voltage at node E to cut off Q3 for a lower current therethrough. If the Q3 collector current is greater than a prescribed value such as 2 amperes, then the Q3 base-emitter voltage has become sufficiently negative to pull the node E voltage sufficiently below the charge voltage on C7 (that is set by R10 and R11) to cause Q5 to conduct to fix the maximum $V_{be}$ of Q3 and thus the maximum current that Q3 can draw. This causes Q3 to be cut off. In this manner, circuit 35 satisfies the third control function noted above.

The ring-trip circuit 43 comprises the transistors Q6, Q7 and Q8, resistors R14, R15, R16 and R17, a diode D7, C9 and C10, and the capacitor C5 which is a nonpolar capacitor connected between the common terminal 41 at the output of converter 37 and the tip side 14 of the drop line such that it is connected in series with C27 of handset 10 through contacts 46 and 47 and R6 and R26. With the hook-switch contacts 22 closed and arm 46 connected to contact 47, C3 discharges during the subsequent separation interval 126 through C5, R7, B1, R23, contacts 46 and 47 and line 39 to charge C5 in a time constant of approximately 1 millisecond so that the ring side 16 of the line goes from approximately −100 volts toward the ground reference potential. When the difference between the charge voltages on C5 and C3 reaches or is slightly less than 6 volts, the loop closes through decoupling diode D3, hybrid winding 53, R14, and the battery (supply voltage −V). The resultant voltage on R14 causes Q6 to conduct to produce a signal on line 55 which causes the carrier subscriber terminal to transmit a ring trip signal to the central office. This operation of Q6 is coupled through R15 to Q7 which conducts to turn Q8 on to connect line 31 to −V and thereby effect local ring-trip and disable the ringer circuit 12. C9 is a 100 microfarad capacitor which completes the VF circuit through the primary of the hybrid 18 while isolating line 54 from ground. C10 is a 10 microfarad capacitor which delays release of local ring trip to prevent false loop opening due to dial pulse transients from the central office terminal.

The overall operation of ringer generator 12 will now be described. When an input signal 120 is absent from line 31, all of the transistors and diodes in the FIGURE are nonconducting and the capacitors are discharged so that no DC voltages are present between the output lines 39 and 40 and the neutral terminal 41, and the relay coil 45 is deenergized to connect the ring lead 16 through the relay arm 46 and contact 47 to VF hybrid 18. When ring pulses 124 are present on input line 31, R1 and C1 filter out any carrier signal to provide DC pulses 124 that pulse Q1 on to provide drive current for Q2. This causes Q2 to conduct at the 20 Hz ringing rate to connect the battery voltage −V to node A to charge C7 and C8 and to energize the relay coil 45. Since C7 and C8 are initially discharged, the zero volt potential at node B holds Q3 cut off. The voltage −V now at node A, however, causes these capacitors C7 and C8 to charge toward approximately −3 volts. When C8 charges to approximately 0.6 volt during each ring pulse 124, R12 provides a starting current for Q3 which causes the latter to conduct lightly through primary winding W1 to induce a positive feedback voltage in W2. Q4 decouples the low resistance feedback winding W2 from the Q3 base to allow R12 to provide this starting current. As long as the Q5 base voltage provided by C7 at node C is at least 0.6 volt more positive then its emitter voltage at node E, however, Q5 will conduct through R5 to hold Q4 cut off and Q3 only lightly conducting. Ringing voltages are absent from lines 39 and 40 at this time. This means that Q5 effectively prevents the Q4 base electrode going sufficiently negative to allow conduction of Q4 and regenerative turn on of Q3. Since C7 charges faster than it discharges, the net charge voltage on C7 and at node C increases during each ring pulse time interval 124. When the charge voltage on C7 exceeds approximately 0.6 volt during the third ring pulse 124, for example, Q5 is cut off to allow Q4 to conduct to regeneratively turn on Q3. In this manner, C7, R10 and R11 delay the initial operation of the power converter during several ring pulses 124. C7 continues to charge during each ring pulse 124 and to discharge during each separation interval 126 to provide an average voltage of approximately 1.2 volts at node C.

As the current in Q3 increases, a field is built up on the transformer windings which store energy. When the current in Q3 can no longer increase, i.e., after the node E potential on the Q5 emitter (which is floating) reaches 0.6 volt plus the charge voltage of C7 and causes Q5 to conduct, the field on the windings collapses and the voltage thereon reverses. The resultant positive voltage at node D drives Q4 into cutoff and turns D4 on to short circuit the Q4 base-emitter junction and clamp the Q3 base positive to rapidly cut off Q3. As the field collapses in the transformer windings, current flows in each half of W3 to charge C3 and C4 and provide a negative DC ringing voltage (−120 volts) on line 39 and a positive DC ringing voltage (+120 volts) on line 40. When the field on W1 is fully collapsed, the charge voltages on C7 and C8 cause R13 to provide a starting current which causes regenerative turn on of Q3. During normal operation, the power converter 37 free-runs in this manner during both time intervals of ring pulses 124 and separation intervals 126 for charging C3 and C4 to provide the desired negative and positive DC output ringing voltages on lines 39 and 40. During each ring pulse 124, the relay coil 45 is energized to connect the ring line 16 through the arm 46 and contact 48 to the positive ringing voltage on line 40. Conversely, during each separation interval 126 the relay coil 45 is de-energized to connect the ring line 16 through arm 46 and contact 47 to the negative DC ringing voltage on line 39. In this manner, an AC ringing signal is provided on the ring line 16 which drives the AC ringer 25.

The voltage across W3 depends on the energy stored-energy delivered balance between C3 and C4 and the ringer 25. The voltage across W2 during conduction of Q3 is fixed by the voltage on W1 and the turns ratio. The voltage on W2 during nonconduction of Q3, however, is fixed by the voltage across W3 and the turns ratio.

When a light load such as a single ringer 25 is connected across the tip and ring lines 14 and 16, less charge will be drained from C3 and C4 each time the arm 46 is connected to contacts 47 and 48, so that the output voltage across these capacitors and the associated halves of W3 will tend to increase. During nonconduction of Q3, then the voltage on W2 will be greater than normal due to the higher voltage which is already on C3 and C4. When the field on T1 collapses, this increased voltage is reflected to node D. If the voltage reflected to node E is greater than the sum of the voltages for D4, D5 and D6, these diodes conduct to discharge C7 somewhat through R5 and the feedback winding W2. This lowers the voltage at node E for which Q5 conducts to catch the Q3 $V_{be}$ and cause it to cut off. This results in a decrease in the peak current in Q3 during the next storage part of the oscillator 37 cycle so as to limit the output voltage of the power converter to prevent burning out the storage capacitors C3 and C4.

When a heavy load such as several handsets and associated ringers are connected across the tip and ring lines 14 and 16, the resultant impedance that is presented to ringer generator 12 is relatively low such that C3 and C4 must provide additional output current to the ringers. In such an application, Q3 will provide additional collector drive current to satisfy the increased load demand. This also causes the Q3 base-emitter voltage to increase. The maximum voltage on C7 during a ring pulse 124 is approximately 1.4 volts which is set by R10 and R11. When the Q3 base-emitter voltage is greater than about 1.4 volts such that node E is at least 0.6 volt more negative than the voltage set by C7 on line 52, then Q5 conducts to catch the Q4 base which fixes the maximum Q3 base-emitter voltage and the maximum collector current it can draw. This limiting of the Q3 collector current causes the field in the transformer windings to collapse to regeneratively cut off Q3 and Q4. Thus, it is seen that the series resistors of voltage divider R10–R11 effectively set the maximum voltage on C7 that limits the maximum Q3 collector current and thus controls the maximum power output of converter 37.

If the subscriber handset goes off-hook during the silent period T2 of a ringing cycle when the relay coil 45 is de-energized such that the ring line 16 is connected to relay contact 47 and a DC output voltage is absent from lines 39 and 40, then D3 conducts to pass a loop current through R14. This causes Q6 to conduct to energize an oscillator (not shown) which transmits a carrier signal to the central office to disable the ringing generator there. Conduction of Q6 also causes Q7 to conduct to turn on Q8 to clamp input line 31 to the supply voltage to turn off the drive to the pulsing circuit 33 and, thereby, disable the ringer generator 12. D7 protects Q6 for a reverse transient voltage swing which may appear on the base of Q6 during lightning.

If the subscriber handset 10 goes off-hook during the ringing period T1 of a ringing cycle, loop current can flow only when the relay coil 45 is de-energized and the voltage between the ring line 16 and ground is less than the supply voltage −V which is coupled to the cathode of D3. If the capacitor C5 is absent from this circuit 12, ring trip can not be accomplished during the ringing period T1 of a ring cycle.

If the handset goes off-hook during a ring pulse 124, then the relay coil 45 is energized and loop current cannot flow to accomplish ring trip because of the open circuit between the arm 46 and the relay contact 47. When the relay coil 45 is de-energized during the subsequent separation interval 126 of the ringing period T1, the −120 volt DC output voltage on line 39 from C3 reverse biases diode D3 to prevent loop current flowing and to effect ring trip. The off-hook handset 10 presents a low impedance R23 of approximately 200 ohms across the line, however, which is in series with the 4 microfarad capacitor C5 through R7, R6 and C3. C5 is therefore rapidly charged to the ringing voltage on line 39 in less than 1 millisecond to make the net voltage on the ring line 16 drop below the supply voltage −V so that D3 conducts to pass a loop current which is detected by Q6, Q7 and Q8 to effect ring trip.

Although this invention is described in relation to a preferred embodiment thereof, variations and modifications will occur to those skilled in the art. By way of example, an embodiment of this invention is not limited to the element values and voltages in the application described above. Also, the power converter may be modified by omitting R5, connecting R4 to node E, and replacing Q4 with the parallel combination of a capacitor and a junction diode which is poled oppositely to D4 and is connected between the Q3 base and node E. Although this new diode operates satisfactorily, using the transistor Q4 has the particular advantage of providing current gain so that less emitter current is required during conduction of Q5. Further, since Q4 operates in saturation, its collector-emitter voltage is low and more nearly constant as a function of temperature than that of a diode. The new shunt capacitor here operates to provide a path for transient signals associated with turn on and turn off of Q3. The new diode provides a path for the feedback signal around Q3 while allowing the Q3 base to be raised to the active region without producing excessive power loss in feedback resistor R4. The scope of this invention is therefore to be determined from the attached claims rather than from the above-detailed description.

What is claimed is:

1. A ringer-power generator circuit responsive to a ringing signal including a train of ring pulses for selectively producing controlled positive and negative DC output voltage signals for actuating a ringer device, comprising:

energy storage-energy discharge type oscillator means operative for producing both positive and negative DC output voltages during energization thereof: said oscillator means comprising a first transistor having emitter, base and collector electrodes; a transformer having a primary winding and a feedback winding, the series combination of said first transistor emitter-collector path and said primary winding being electrically connected across a voltage source, one side of said feedback winding and said first transistor emitter being electrically connected to the same one side of said voltage source; and feedback means electrically connecting the other side of said feedback winding to said first transistor base;

control means for energizing and controlling operation of said oscillator means so that it produces the output voltages only during a prescribed time period in which a series of ring pulses are present, for regulating its maximum output power, and for regulating its maximum output voltages; said control means comprising a first capacitor having one terminal electrically connected to the one side of said voltage source and an other terminal for electrical connection to the other side of said voltage source; and catching means having a first terminal electrically connected to said oscillator means and a second terminal electrically connected to the other terminal of said first capacitor, said catching means being operative for catching the first transistor base-emitter junction voltage at a first prescribed level conduction of said first transistor for preventing an increase in this voltage in order to cause said first transistor to be cut off; and connecting means responsive to ring pulses and the absence thereof in a train of ring pulses for alternately electrically connecting the other terminal of said first capacitor to the other side of said voltage source for energizing and de-energizing said control means, and for electrically connecting the ringer device alternately to the positive and negative output voltages of said oscillator means;

charging of said first capacitor up to a second prescribed level, which may be less than the first prescribed level, during energizations of said control means determining a first time interval during which said first capacitor maintains said catching means operative for holding said first transistor substantially nonconducting for preventing said oscillator means operating to produce the output voltages; a charge voltage greater than the second prescribed level on said first capacitor causing said catching means to operate to allow said oscillator means to operate to produce both positive and negative output voltages; a charge voltage on said first capacitor that is substantially equal to the first prescribed level causing said catching means to operate to catch the first transistor base-emitter junction voltage at this first prescribed level when it rises to this value for preventing it increasing further and thereby fixing the maximum value of current in said first transistor and causing the latter to be cut off.

2. The circuit according to claim 1 wherein said control means further comprises a first resistor electrically connected in parallel with said first capacitor, and a second resistor having one end electrically connected to the other terminal of said first capacitor and an other end for electrical connection to said supply voltage by operation of said connecting means, the first transistor base-emitter junction voltage, for which said catching means operates to limit this junction voltage to set the maximum current in said first transistor and cause the latter to be cut off, being a function of values of said first capacitor and first and second resistors.

3. The circuit according to claim 2 wherein said control means further comprises the series combination of a first diode, which is a junction diode, and a second diode, which is a Zener diode, electrically connected in series between the second terminal of said catching means and said first transistor base, said first and second diodes conducting when the feedback voltage is greater than the sum of the junction and breakdown voltages of these diodes and the voltage on said first capacitor for discharging said first capacitor through these diodes and said feedback winding for controlling the maximum output voltages.

4. The circuit according to claim 3 wherein said feedback means comprises a third diode, which is a junction diode, electrically connected in series with said first and second diodes across the first and second terminals of said catching means.

5. The circuit according to claim 4 wherein said catching means comprises a second transistor having a collector and a base electrically connected to the one and other terminals of said first capacitor, respectively, and an emitter electrically connected to said feedback means; said first, second and third diodes being electrically connected in series across the base-emitter junction of said second transistor; said second transistor periodically conducting to catch the first transistor base-emitter junction voltage at the first prescribed level when the sum of the voltages across the first transistor base-emitter junction and said third diode is substantially equal to the sum of the second transistor base-emitter junction voltage and the first capacitor charge voltage for catching the first transistor base-emitter junction voltage at the first prescribed level.

6. The circuit according to claim 5 wherein said feedback means further comprises third and fourth resistors, each having one end electrically connected to the other end of said feedback winding, and a third transistor having its primary conduction path electrically connected between the other end of said third resistor and said first transistor base and having a base electrically connected to the other end of said fourth resistor and said second transistor emitter, said third diode being electrically connected between the bases of the first and third transistors.

7. The circuit according to claim 6 wherein said control means further comprises the parallel combination of a second capacitor and fifth resistor electrically connected across the series combination of said first and second diodes, and a sixth resistor having one end electrically connected to the side of said second diode that is electrically connected to said first transistor base, the other side of said sixth resistor being electrically connected to the other side of said supply voltage by said connecting means, charging of said second capacitor to a third prescribed level during ring pulses determining a second time interval during which the portion of the supply voltage coupled to said oscillator means is not sufficient to cause it to oscillate.

8. The circuit according to claim 6 wherein said feedback means comprises a fifth resistor having one end connected to the other side of said feedback winding, and the parallel combination of a fourth diode and a second capacitor electrically connected between the other end of said fifth resistor and the base of said first transistor, the other end of said fifth resistor also being electrically connected to said second transistor emitter, said third and fourth diodes being electrically connected in parallel and oppositely poled.

9. A ringer-power generator circuit responsive to a ringing signal that comprises silent periods between ringing periods that include a plurality of ring pulses having separation intervals therebetween, for selectively producing regulated positive and negative DC output voltage signals for actuating a ringer device, the circuit comprising:

first means which is an oscillator means for selectively producing both positive and negative DC output voltages throughout the major portion of a ringing period upon energization thereof; said first means comprising a first transistor having a primary emitter-collector conduction path and feedbck means responsive to current in the primary conduction path for coupling a feedback voltage to said first transistor base for controlling conduction of the latter;

second means for energizing and controlling operation of said first means so that it produces the output voltages only during ringing periods, for regulating its maximum output power, and for regulating its maximum output voltages; said second means comprising a first capacitor having one terminal electrically connected to one side of a voltage source and an other terminal for electrical connection to the other side of said voltage source for charging said first capacitor; and catching means having a first terminal electrically connected to said first means and a second terminal electrically connected to the other terminal of said first capacitor; said catching means being operative for catching the first transistor base-emitter junction voltage at a first prescribed level during conducting of said first transistor for preventing an increase in this voltage in order to cause said first transistor to be cut off; and third means responsive to ring pulses and the absence thereof during a ringing period for alternately electrically connecting the other terminal of said first capacitor to the other side of said voltage source for energizing and de-energizing said second means, and for electrically connecting the ringer device alternately to the positive and negative output voltages of said first means;

charging of said first capacitor up to a second prescribed level, which may be less than the first level, during energizations of said second means determining a first time interval during which said first capacitor maintains said catching means operative in a first state for holding said first transistor substantially nonconducting for preventing said first means oscillating for producing the output voltages; a charge voltage greater than the second prescribed level on said first capacitor causing said catching means to operate in a second state to allow said first means to operate to produce both positive and negative output voltages; a charge voltage on said first capacitor that is substantially equal to the first prescribed level causing said catching means to operate in the first state to catch the first transistor base-emitter junction voltage at the first prescribed level when it rises to this value for preventing it increasing further and thereby fixing the maximum value of current in the primary conducting path of said first transistor and causing the latter to be cut off.

10. The circuit according to claim 9 wherein said second means further comprises a first resistor electrically connected in parallel with said first capacitor, and a second resistor having one end electrically connected to the other terminal of said first capacitor and an other end for electrical connection to said supply voltage by operation of said third means, the first transistor base-emitter junction voltage for which said catching means operates alternately in the first state during a ringing period to limit this junction voltage to set the maximum current in said first transistor and cause the latter to be cut off being a function of the voltage level set at the second terminal of said catching means by said first capacitor and first and second resistors.

11. The circuit according to claim 10 wherein said catching means comprises a second transistor having a collector and base electrically connected to the one and other sides of said first capacitor, respectively, and an emitter electrically connected to said feedback means, said first and second resistors and first capacitor setting a voltage level on said second transistor base which causes the latter to periodically conduct to catch the first transistor base-emitter junction voltage.

12. The circuit according to claim 11 wherein said second means further comprises the series combination of a first diode, which is a junction diode, and a second diode, which is a Zener diode, electrically connected in series between said second transistor base and said first transistor base, said first and second diodes conducting when the feedback voltage is greater than the sum of the junction and breakdown voltages of these diodes and the first capacitor charge voltage for discharging said first capacitor through these diodes and said feedback winding for controlling the maximum output voltages.

13. The circuit according to claim 12 wherein said first means further comprises a multiple-winding transformer having a primary winding connected in series with the primary conduction path of said first transistor between the sides of said voltage source and having a feedback winding, one side of said feedback winding and said first transistor emitter being electrically connected to the same one side of said voltage source; said feedback means electrically connecting the other side of said feedback winding through a third-junction diode to said first transistor base, said first, second and third diodes being electrically connected in series across the base-emitter junction of said second transistor, said second transistor conducting to catch said first transistor base-emitter junction voltage at the first prescribed level when the sum of the voltages across the first transistor base-emitter junction and said third diode is substantially equal to the sum of the second transistor base-emitter voltage and the first capacitor charge voltage for catching the first transistor base-emitter junction voltage at the first prescribed level.

14. The circuit according to claim 13 wherein said feedback means further comprises third and fourth resistors, each having one end electrically connected to the other end of said feedback winding, and a third transistor having its primary conduction path electrically connected between the other end of said third resistor and said first transistor base and having a base electrically connected to the other end of said fourth resistor and to said second transistor emitter, said third diode being electrically connected between the bases of the first and third transistors.

15. The circuit according to claim 13 wherein said second means further comprises the parallel combination of a second capacitor and fifth resistor electrically connected across the series combination of said first and second diodes, an a sixth resistor having one end electrically connected to the side of said second diode that is electrically connected to said first transistor base, the other side of said sixth resistor being electrically connected to the other side of said voltage source by said connecting means, charging of said second capacitor to a third prescribed level during ring pulses determining a second time interval during which the portion of the source voltage coupled to said oscillator means is not sufficient to fully turn on the latter.

* * * * *